(12) United States Patent
Scott

(10) Patent No.: US 6,843,465 B1
(45) Date of Patent: Jan. 18, 2005

(54) MEMORY WIRE ACTUATED CONTROL VALVE

(76) Inventor: Loren W. Scott, 6867 Watercourse, Carlsbad, CA (US) 92008

(*) Notice: Subject to any disclaimer, the term of this patent is extended or adjusted under 35 U.S.C. 154(b) by 0 days.

(21) Appl. No.: 10/640,746

(22) Filed: Aug. 14, 2003

(51) Int. Cl.⁷ ............................................... F16K 31/66
(52) U.S. Cl. .................................. 251/129.06; 251/294
(58) Field of Search .................. 251/129.01–129.08, 251/294, 110, 318–334

(56) References Cited

U.S. PATENT DOCUMENTS

| | | | |
|---|---|---|---|
| 5,033,173 A | * | 7/1991 | Hagewood .................... 28/190 |
| 5,144,813 A | | 9/1992 | Orner et al. |
| 5,684,448 A | | 11/1997 | Jacobsen et al. |
| 5,786,563 A | | 7/1998 | Tiburzi |
| 5,927,607 A | | 7/1999 | Scott |
| 5,979,482 A | | 11/1999 | Scott |
| 5,979,492 A | | 11/1999 | Miller |
| 6,086,042 A | | 7/2000 | Scott et al. |
| 6,156,100 A | | 12/2000 | Conrad et al. |
| 6,236,809 B1 | | 5/2001 | Cassidy et al. |
| 6,343,714 B1 | | 2/2002 | Tichenor |
| 6,441,746 B1 | * | 8/2002 | Taborisskiy et al. ... 340/815.78 |
| 6,542,133 B1 | * | 4/2003 | Kelman et al. ................. 345/7 |

* cited by examiner

Primary Examiner—Paul J. Hirsch
(74) Attorney, Agent, or Firm—Cohen Sakaguchi & English LLP

(57) ABSTRACT

A memory wire actuated control valve comprises a memory wire actuator operatively coupled to a fluid control valve. The memory wire actuator includes a housing having an interior cavity enclosing an electrical platform assembly, an activation wire and a transfer mechanism. The activation wire is formed of a shape memory alloy, often called a "memory wire" or "muscle wire." The activation wire is electrically connected to the electrical platform and mechanically coupled to the transfer mechanism. The actuator is activated by conducting electrical current through the activation wire causing the wire to contract thereby actuating the transfer mechanism. The transfer mechanism is operable coupled to the fluid control valve such that actuated and de-actuating the transfer mechanism open and closes the valve.

21 Claims, 3 Drawing Sheets

MEMORY WIRE ACTUATED CONTROL VALVE

FIELD OF THE INVENTION

The present invention relates generally to the field of electrically operated devices, and more specifically to an improved fluid control valve and method of manufacturing and using the same. Such valves have application in a variety of fields for controlling fluid flow, including irrigation, automotive, and industrial applications.

BACKGROUND OF THE INVENTION

Fluid control valves are typically comprised of a valve assembly and an actuator which applies a motive force to a plunger rod or other coupling device of the valve assembly to open and close the valve. The most common actuator used with fluid control valves is a solenoid device. A solenoid actuator generally consists of an electrical coil which when energized with an electrical potential, produces an electromagnetic field that is utilized to apply a motive force to a magnetized work element such as a plunger.

Many fluid control valves have been previously disclosed. For example, U.S. Pat. No. 5,979,482, the disclosure of which is incorporated herein by reference in its entirety, discloses a solenoid actuated pilot valve assembly specially adapted for use in irrigation systems. The pilot valve comprises a solenoid device having a cylindrical housing enclosing an electrical coil. The electrical coil surrounds a ferrous plunger which is operatively coupled to a valve sealing cap of the pilot valve. When the coil of the solenoid is energized, the plunger retracts thereby allowing the valve sealing cap to retract from its valve seat and opening the pilot valve.

The solenoid actuated fluid control valve suffers from several drawbacks. For one, a solenoid is relatively heavy and bulky because it requires an electrical coil and a magnetizable plunger element. In addition, solenoid devices have fast actuation times which can result in excessive water hammer.

Accordingly, there is a need for an actuator and fluid control valve which overcome the drawbacks of previous designs.

SUMMARY OF THE INVENTION

The present invention provides an improved fluid control valve assembly and methods of manufacture and use of the same. The improved valve assembly is especially useful under dirty, contaminated or salt water conditions. The fluid control valve assembly comprises a particularly innovative memory wire actuator which may be operatively coupled to any type of valve which can be actuated by a linear or rotational motive force. For example, the memory wire actuator may be operatively coupled to a typical pilot valve via a plunger rod.

The memory wire actuator includes a housing defining an interior cavity. The housing has an interface which may be operably coupled to a fluid control valve. The interior cavity of the housing encloses an electrical platform assembly, an activation wire and a transfer mechanism. The electrical platform assembly is mounted in the interior cavity of the housing. The activation wire is formed of a shape memory alloy. Such wires are often referred to as "memory wires" or "muscle wires." The activation wire exhibits a property known as "shape memory effect." This "effect" simply means that at a specific transition temperature a deformed piece of such a shape memory alloy will return to its shape prior to being deformed. In the case of a memory wire, the wire is stretched while it is below the transition temperature and when the wire is heated above its transition temperature it contracts to its unstretched length. A common method of heating a memory wire is to simply conduct electrical current through the wire by applying an electrical potential across the wire causing electrical current to conduct through the wire. The activation wire is electrically connected to the electrical platform and is also mechanically anchored to the electrical platform.

The transfer mechanism converts the force generated by the activation wire into a force which can be used to actuate a valve coupled to the memory wire actuator. The transfer mechanism is coupled to the activation wire such that energizing or de-energizing the activation wire actuates the transfer mechanism. The transfer mechanism may include a biasing device which exerts a force on the activation wire to stretch the activation wire when it is in the de-energized state. Alternatively, the biasing device may be provided on a fluid control valve adapted for use with the memory wire actuator. The transfer mechanism also comprises an output device which may be operably coupled to a fluid control valve such that actuation of the transfer mechanism acts to adjust the fluid control valve.

In a further aspect of the present invention, the memory wire actuator is operably coupled to a pilot valve. The pilot valve may be removably attached to the housing of the memory wire actuator, or alternatively, the pilot valve may be integral to the actuator or permanently attached to the actuator. The pilot valve has a plunger operably coupled to the transfer mechanism of the memory wire actuator through a plunger rod. The pilot valve may include the biasing device and may comprise a coil spring which engages the plunger. The force of the compressed spring pushes the plunger toward a valve seat. A seat seal is mounted on the plunger and engages the valve seat when the pilot valve is in the closed position. When the memory wire actuator is activated to open the pilot valve, the transfer mechanism pulls the plunger and seat seal away from the valve seat thereby opening the pilot valve.

The memory wire actuator and fluid control valve of the present invention has numerous applications, including industrial machinery, commercial and residential water systems, and is particularly well-suited to irrigation systems. In a common irrigation system, a main water supply line feeds into a plurality of control valves which may be opened or closed to control the flow of water to the outlet of the control valves. The outlet of the control valves are connected to a line feeding one or more sprinkler units. The control valves are commonly actuated by a pilot valve which when opened provides pressurized water to a diaphragm that applies a force to actuate the control valve. One such control valve is described in U.S. Pat. No. 5,979,482, the disclosure of which is hereby incorporated by reference in its entirety.

Accordingly, the present invention provides an improved fluid control valve assembly and methods of manufacturing and using such valve.

DETAILED DESCRIPTION OF THE INVENTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
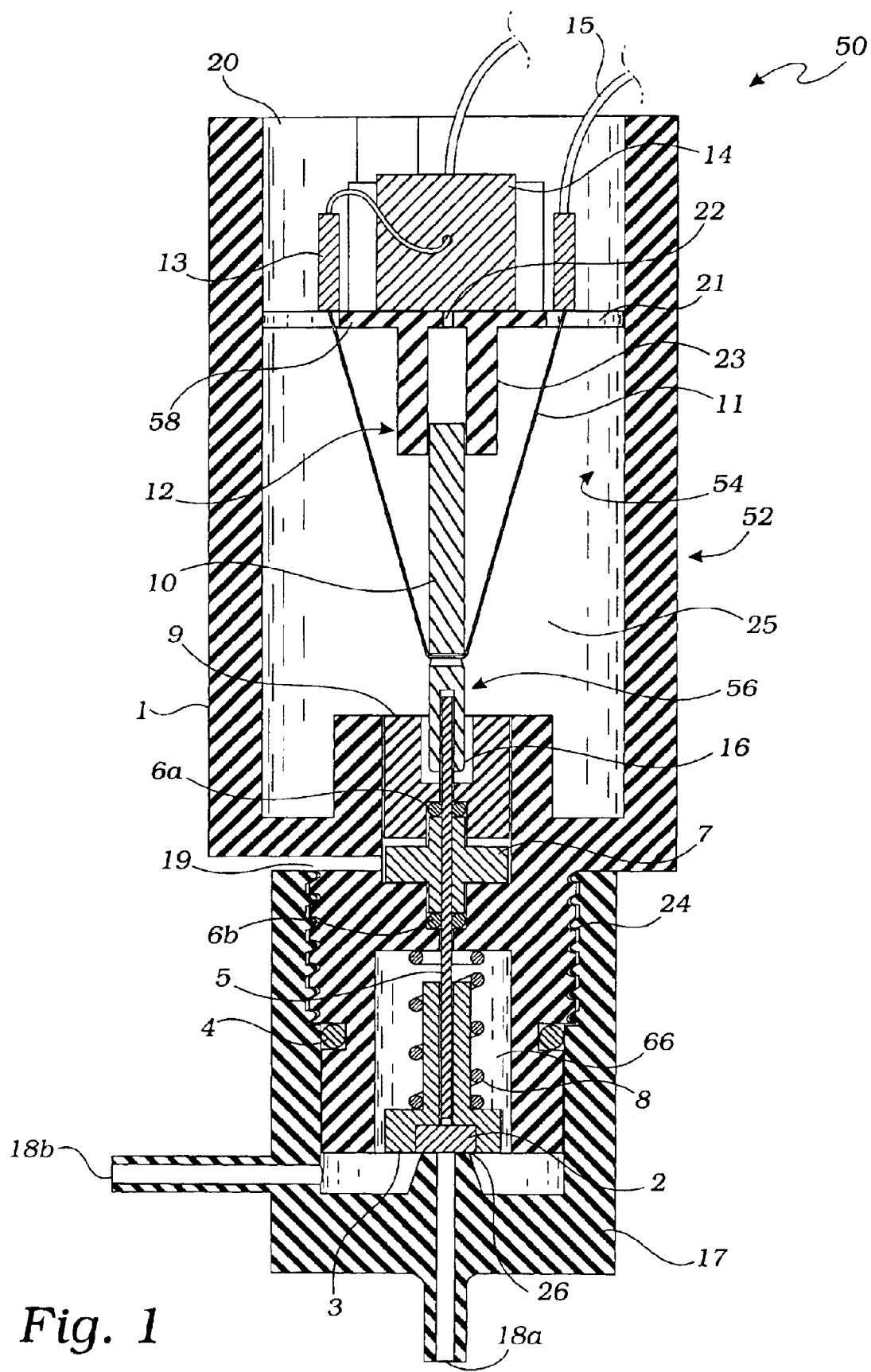
FIG. 1 is a cross-sectional view of a memory wire actuated control valve in a valve closed position according to the present invention.

Referring now to the drawings, FIG. 1 is a cross-sectional view of a memory wire actuated control valve 50 according to the present invention. The wire actuated control valve 50 comprises a memory wire actuator assembly 52 operably coupled to a pilot valve assembly 17. The memory wire actuator assembly 52 may be removably attached to the pilot valve assembly 17 by threads so that the pilot valve assembly screws onto the memory wire actuator assembly 52.

The memory wire actuator assembly 52 comprises a housing 1 which may be made of any suitable material including a variety of plastics such as PVC, polyethylene or polypropylene. The housing 1 may have a cylindrical shape which defines an interior cavity 54 a portion of which comprises an air chamber 25. Within the interior cavity 54 encloses an electrical platform assembly 12, an activation wire 11 and a transfer mechanism 56.

The electrical platform assembly 12 is inserted into the interior cavity 54 and 12 bears on a shoulder of the housing 1. The electrical platform assembly 12 includes a frame 58 which is shown in detail in FIGS. 2 and 3. The frame 58 has a round base 60, a cylindrical pull rod guide 23 and four rods 62 extending out from the base 60. The four rods 64 are used to support and position resistor 14. The base 60 has two radial slots 21. The electrical platform assembly 12 further includes a pair of connectors 13 affixed to the frame 58 along the slots 21. The connectors 13 may be anchored to the frame 58 by any suitable means, including epoxy, adhesive, or mechanical attachment. One end of an activation wire 11 is connected to one of the connectors 13 and the other end of the activation wire is connected to the other connector 13. The connectors 13 may be moved radially along the slots 21 before being fixed to the frame 58 in order to allow adjustment to eliminate slack in the activation wire 11. Once they are properly adjusted, the connectors 13 are fixed in place on the frame 58. A resistor 14 is also mounted on the electrical platform and is electrically connected to one of the lead wires 15 and to one of the connectors 13. A cylindrical pull rod guide 23 is also provided on the frame which slidably receives a pull rod 10.

The activation wire 11 is formed of a shape memory alloy and is often referred to as a "memory wire" or "muscle wire." As described above, the activation wire 11 will contract in length upon application of an electrical potential across the wire causing sufficient current to conduct through the wire such that the temperature of the wire rises above its transition temperature. Conversely, upon removal of the electrical current, the activation wire 11 will cool to below the transition temperature and will expand in length. The contraction and expansion of the activation wire 11 is used to exert a force that actuates and de-actuates a transfer mechanism 56 which in turn opens and closes the pilot valve 17.

The transfer mechanism 56 is coupled to the activation wire 11 by way of a pull rod 10 of the transfer mechanism 56. The activation wire 11 is threaded through a hole in the pull rod 10 such that the pull rod 10 is in contact with the activation wire 11 at about the midpoint of the length of the activation wire 11. In this case, the pull rod 10 is preferably made from an electrically non-conductive material, such as polymer with a high melt temperature. It should be understood that the activation wire may be two or more wire segments each connected to connectors 13 on the platform 60 pull rod 10. The upper end of the pull rod 10 is slidably received in the pull rod guide of the frame 58. The bottom end of the pull rod 10 couples to the particular device being actuated by the actuator 52, in this example, the pilot valve 17. In the embodiment of FIG. 1, the bottom end of the pull rod 10 is received in a bore of a vent cap 9. The tip of the bottom end of the pull rod 10 does not quite reach the bottom surface of the bore in the vent cap such that there is a bias gap 16. This ensures that there is a positive bias seating the seat seal 2 to the pilot valve seat 26, as described in detail below.

The transfer mechanism 56 may further comprise a biasing device which exerts a force on the pull rod 10 in a direction which stretches the activation wire 1. The biasing device ensures that when the actuator 52 is de-energized, the pull rod 10 is pulled downward into the de-activated position and the activation wire 11 returns to its stretched length. In the present exemplary embodiment of this invention, the biasing device is provided in the pilot valve assembly 17.

The pilot valve assembly 17 includes a plunger rod 5 which is mechanically coupled to the pull rod 10, for example by press fitting the plunger rod 5 into a bore in the end of the pull rod 10 or by mating threads on the respective parts. The plunger rod 5 is connected to a plunger 3 which houses a seat seal 2. The plunger 3 sits in a cavity 66 in which a plunger biasing spring 8 is also housed. One end of the plunger biasing spring 8 is seated on a shoulder of the plunger 3 and the other end bears on the surface of the cavity 66. The plunger biasing spring 8 exerts a force tending to push the plunger rod 5 and pull rod 23 into their de-activated actuator position thereby seating the seat seal 2 in the valve closed position (see FIG. 1).

The flow circuit of the pilot valve assembly 17 comprises a pilot valve seat 26, flow orifices 18a and 18b and a flow path between flow orifices 18a and 18b. As can be seen in FIG. 1, when the seat seal 2 is in the valve closed position, the seat seal 2 bears against the valve seat 26 and blocks the flow orifice 18. In the valve open position shown in FIG. 2, the seat seal 2 is moved away from the valve seat 26, thereby opening the pathway between valve orifices 18a and 18b.

In order to seal the actuator 52 from the flow paths of the pilot valve assembly 17 several O-rings and related components are provided. First, an O-ring 4 is inserted into an O-ring groove of the pilot valve assembly 17. In addition, a pair of O-rings 6 are installed around the plunger rod 5. An O-ring retainer 7 holds the O-rings 6 in place. The external surface of the O-ring 6a seats in a bore of the vent cap 9. Finally, a vent port 19 runs from the cavity housing the O-ring retainer 7 to the exterior of the pilot valve assembly 17 to allow venting of any leakage of fluid past the O-ring 4 and O-ring 6b. This prevents high pressure from being applied to O-ring 6a and contaminating cavity 54 with fluid.

The operation of the memory wire actuated control valve 50 is straightforward. Referring to FIG. 1, in the de-actuated state, i.e. with no electrical current conducting through the actuator 52, the pilot valve 17 is in the valve closed position. In the valve closed position: the activation wire 11 is in its stretched state; the pull rod 10, plunger rod 5 and plunger are pushed to their downward position by the plunger biasing spring 8; and the preceding assembly is holding the seat seal 2 in its closed position against the pilot valve seat.

Figure 2:
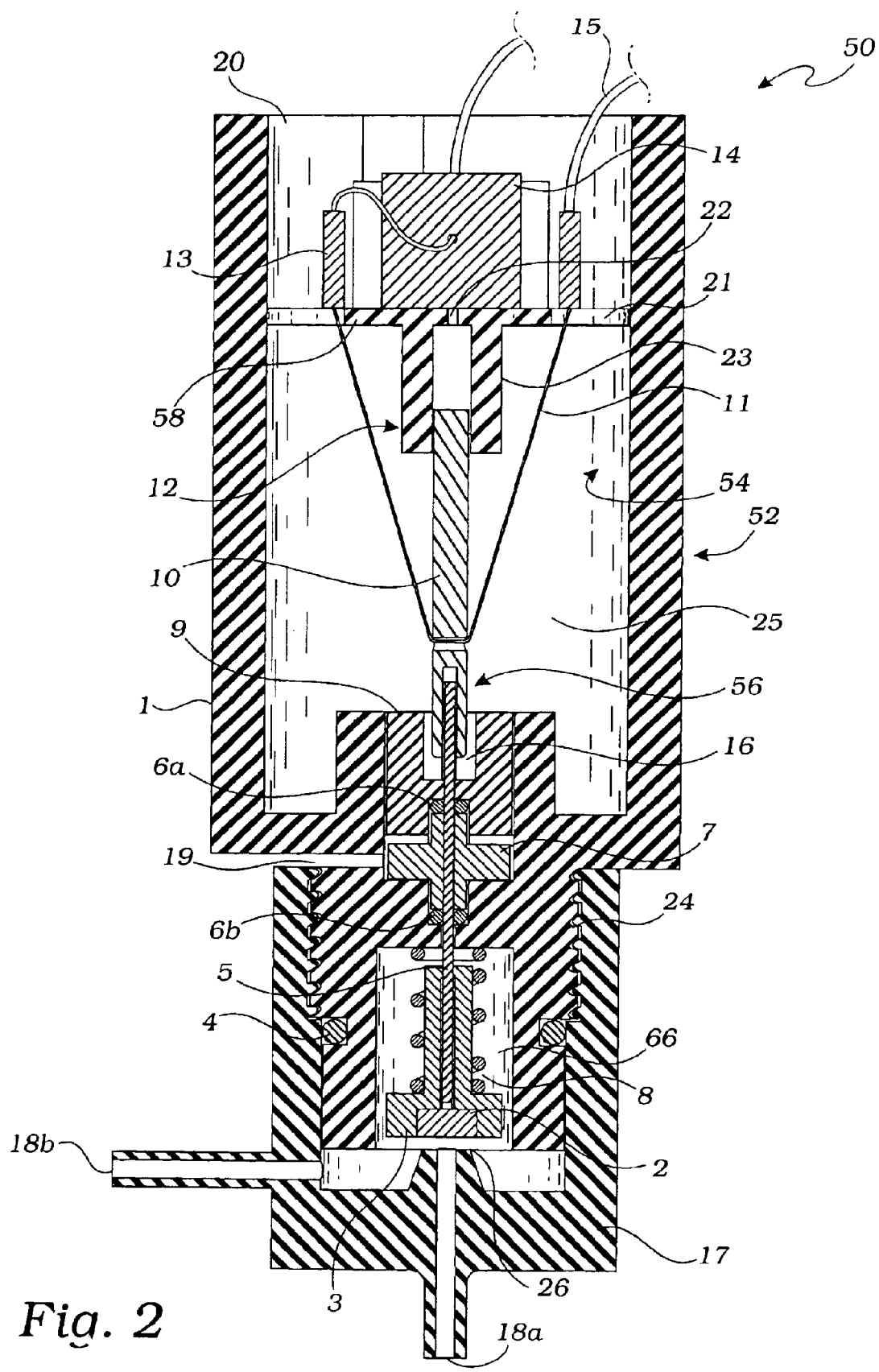
FIG. 2 is a cross-sectional view of a memory wire actuated control valve in a valve open position according to the present invention.
Figure 3:
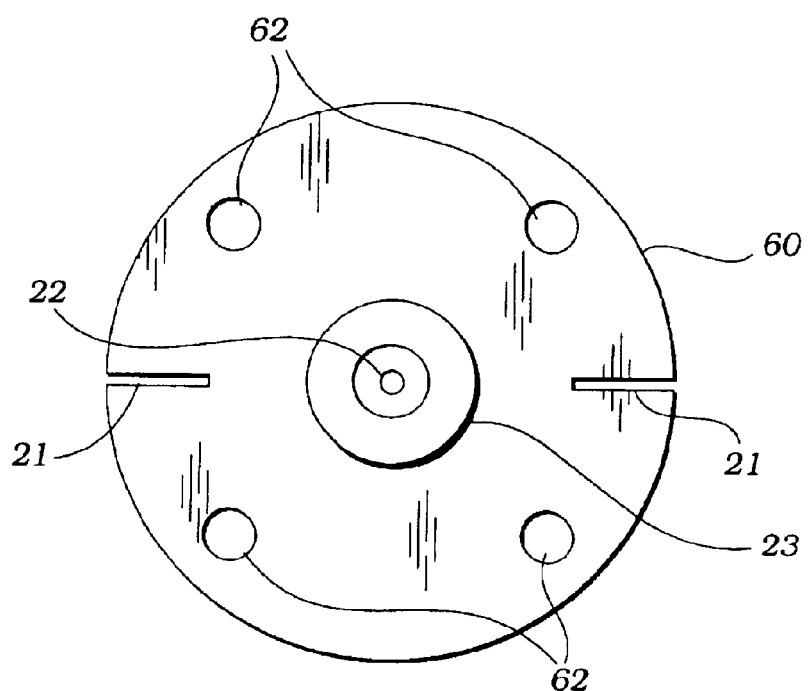
FIG. 3 is a top view of the frame for the memory wire actuated control valve of FIG. 1.
Figure 4:
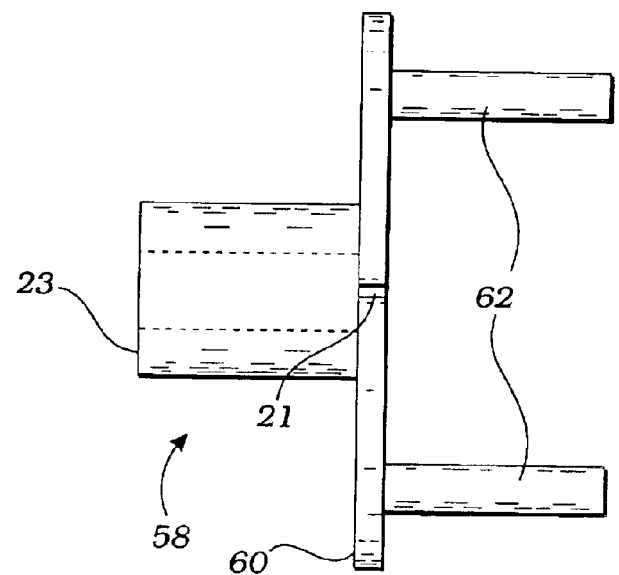
FIG. 4 is a side view of the frame for the memory wire actuated control valve of FIG. 1.

Upon activation of the control valve 50 by application of an electrical potential across the lead wires 15, electrical current conducts through the activation wire 11 thereby heating the wire above its transition temperature. This causes the activation wire 11 to contract which pulls the pull rod 10, the plunger rod 5 and the plunger upward against the force of the plunger biasing spring. In turn, the seat seal 2 is moved upward away from the pilot valve seat 26. As shown in FIG. 2, the valve 17 is now in the valve open position.

To close the valve 17 again, the electrical potential is removed and the activation wire 17 cools to below its transition temperature. This allows the activation wire 11 to stretch helped by the force exerted by the plunger biasing spring 8 through the plunger 3, the plunger rod 5 and the pull rod 10. The seat seal 2 is thereby moved onto the valve seat 26 and the valve is again in the valve closed position shown in FIG. 1.

It should be understood that the use of directional terms such as "downward" and "upward" in the description of the present invention are only based on the orientation of the memory wire actuated control valve as shown in the Figures, and is in no way limiting of the present invention. In addition, it should be appreciated that the memory wire actuated control valve 50 can easily be configured to close the valve 17 upon actuation of the actuator 50 and open the valve 17 upon de-actuation of the actuator 50. This may be especially useful in applications where the valve 17 is normally open. Accordingly, the terms "actuation" and "de-actuation" simply refer to opposite operational positions of the actuator and are interchangeable throughout the description and claims.

Thus, it can be seen that the present invention provides an improved fluid control valve assembly. While the above description contains many specifics, these should not be construed as limitations on the scope of the invention, but rather as examples of particular embodiments thereof. Many other variations are possible.

Accordingly, the scope of the present invention should be determined not by the embodiments illustrated above, but by the appended claims and their legal equivalents. The present invention provides an improved fluid control valve assembly and methods of manufacture and use of the same. The fluid control valve assembly comprises a particularly innovative memory wire actuator which may be operatively coupled to any type of valve which can be actuated by a linear or rotational motive force. For example, the memory wire actuator may be operatively coupled to a typical pilot valve via a plunger rod.

What is claimed is:

1. An actuator comprising:
   a housing defining an interior cavity;
   an electrical platform mounted in said interior cavity of said housing;
   a memory wire having first and second ends, said first and second ends connected to said electrical platform;
   a transfer mechanism coupled to said memory wire such that contraction the length of said memory wire causes said transfer mechanism to move to an actuated position and expansion of the length of said memory wire allows said transfer mechanism to move to a de-actuated position.

2. The actuator of claim 1 further comprising a biasing device coupled to said transfer mechanism such that said biasing device provides a force on said transfer mechanism tending to move said transfer mechanism to said de-actuated position.

3. The actuator of claim 2 wherein said biasing device is a spring.

4. The actuator of claim 1 wherein said transfer mechanism comprises an output device which may be operably coupled to a fluid control valve such that actuation of the transfer mechanism acts to adjust the fluid control valve.

5. The actuator of claim 1 wherein actuation of said transfer mechanism causes an output device of said transfer mechanism to move.

6. The actuator of claim 5 wherein said output device is a pull rod and said pull rod is coupled to said memory wire.

7. The actuator of claim 5 wherein said pull rod is coupled to said memory wire by threading said memory wire through a hole in said pull rod.

8. The actuator of claim 1 wherein said electrical platform comprises:
   a frame having base, said base having at least one opening through which said memory wire passes;
   a first connector connected to said first end of said memory wire, said first connector capable of being affixed to said base in more than one location; and
   a second connector connected to said second end of said memory wire, said second connector capable of being affixed to said base in more than one location.

9. The actuator of claim 8 wherein said at least one opening comprises a pair of radial slots.

10. An actuator comprising:
    a housing defining an interior cavity,
    a memory wire having first and second ends,
    an electrical platform means for providing an electrical potential across said memory wire, said electrical means mounted in said interior cavity of said housing;
    a transfer means coupled to said memory wire for transferring the force caused by contraction and expansion of the length of said memory wire to an output device.

11. A memory wire actuated control valve comprising:
    an actuator comprising:
    a housing defining an interior cavity;
    an electrical platform mounted in said interior cavity of said housing;
    a memory wire having first and second ends, said first and second ends connected to said electrical platform;
    a transfer mechanism coupled to said memory wire such that contraction the length of said memory wire causes said transfer mechanism to move to an actuated position and expansion of the length of said memory wire allows said transfer mechanism to move to a de-actuated position;
    a valve operable coupled to said transfer mechanism such that actuation of the transfer mechanism acts to open and close the valve.

12. The control valve of claim 11 further comprising a biasing device coupled to said transfer mechanism such that said biasing device provides a force on said transfer mechanism tending to move said transfer mechanism to said de-actuated position.

13. The control valve of claim 12 wherein said biasing device is a spring.

14. The control valve of claim 11 wherein actuation of said transfer mechanism causes an output device of said transfer mechanism to move and said output device is coupled to said valve.

15. The control valve of claim 14 wherein said output device is a pull rod and said pull rod is coupled to said memory wire.

16. The control valve of claim 15 wherein said pull rod is coupled to said memory wire by threading said memory wire through a hole in said pull rod.

17. The control valve of claim 11 wherein said electrical platform comprises:
   a frame having base, said base having at least one opening through which said memory wire passes;
   a first connector connected to said first end of said memory wire, said first connector capable of being affixed to said base in more than one location; and
   a second connector connected to said second end of said memory wire, said second connector capable of being affixed to said base in more than one location.

18. The control valve of claim 17 wherein said at least one opening comprises a pair of radial slots.

19. The control valve of claim 11 wherein said valve comprises:
   a plunger rod coupled to said transfer mechanism;
   a plunger connected to said plunger rod, said plunger having a seat seal;
   a biasing spring having a first end which bears on a shoulder of said plunger and a second end which bears on a surface of said valve;
   an input flow orifice and an output flow orifice and a flow path connecting said flow orifices; and
   a valve seat along said flow path such that when said seat seal is seated on said valve seat, said flow path is blocked and said valve is in a closed position and when said seat seal is moved away from said valve seat by actuating said actuator, said valve is in an open position.

20. The control valve of claim 19 further comprising:
   an o-ring seal around said plunger rod which seals said actuator from the flow path of said valve.

21. The control valve of claim 19 further comprising:
   a sealing means for sealing said actuator from the flow path of said valve.

* * * * *